(12) United States Patent
Heisey et al.

(10) Patent No.: US 11,609,030 B2
(45) Date of Patent: Mar. 21, 2023

(54) CHILLER MOTOR WITH COOLING FLOW PATH

(71) Applicant: Johnson Controls Technology Company, Auburn Hills, MI (US)

(72) Inventors: Matthew L. Heisey, York, PA (US); Paul W. Snell, York, PA (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 119 days.

(21) Appl. No.: 16/495,776

(22) PCT Filed: Mar. 23, 2018

(86) PCT No.: PCT/US2018/024113
§ 371 (c)(1),
(2) Date: Sep. 19, 2019

(87) PCT Pub. No.: WO2018/175943
PCT Pub. Date: Sep. 27, 2018

(65) Prior Publication Data
US 2020/0018527 A1    Jan. 16, 2020

Related U.S. Application Data

(60) Provisional application No. 62/476,534, filed on Mar. 24, 2017.

(51) Int. Cl.
*F25B 31/00* (2006.01)
*F25B 31/02* (2006.01)
(Continued)

(52) U.S. Cl.
CPC .......... *F25B 31/006* (2013.01); *F25B 31/026* (2013.01); *H02K 5/203* (2021.01);
(Continued)

(58) Field of Classification Search
CPC .................. F25B 31/006; F25B 31/026; F25B 2339/047; F25B 2341/0012; H02K 5/203;
(Continued)

(56) References Cited

U.S. PATENT DOCUMENTS 3,531,668 A * 9/1970 Cathey ................. G01R 31/343
310/58
5,746,062 A * 5/1998 Beaverson .............. F04D 27/02
62/228.3
(Continued)

FOREIGN PATENT DOCUMENTS

CN    102483054 A    5/2012
CN    103189654 A    7/2013
(Continued)

OTHER PUBLICATIONS

International Search Report and Written Opinion for International Application No. PCT/US2018/024113 dated Jul. 2, 2018, 15 pages.
(Continued)

*Primary Examiner* — Ana M Vazquez
(74) *Attorney, Agent, or Firm* — Fletcher Yoder P.C.

(57) ABSTRACT

A cooling system for a motor to power a compressor in a vapor compression system is provided. The cooling system includes a housing with a cavity enclosing the motor and defining a central axis and fluid directing features extending into the cavity and oriented parallel to the central axis. The cooling system further includes a fluid circuit configured to circulate a cooling fluid between the housing and the motor. The fluid circuit includes a first cooling fluid path defined by directing features that cause a first portion of cooling fluid to travel around a first portion of the motor and a second cooling fluid path defined by fluid directing features that cause a second portion of cooling fluid to travel around a
(Continued)

second portion of the motor. The second portion of the motor is located opposite the first portion.

13 Claims, 8 Drawing Sheets

(51) Int. Cl.
    *H02K 5/20* (2006.01)
    *F04D 29/058* (2006.01)

(52) U.S. Cl.
    CPC .... *F04C 2240/20* (2013.01); *F04C 2240/603* (2013.01); *F04D 29/058* (2013.01); *F25B 2339/047* (2013.01); *F25B 2341/0012* (2013.01)

(58) Field of Classification Search
    CPC ........ H02K 5/20; H02K 9/19; F04C 2240/20; F04C 2240/603; F04D 29/058
    See application file for complete search history.

(56) References Cited

U.S. PATENT DOCUMENTS

| | | | |
|---|---|---|---|
| 6,300,693 B1 | 10/2001 | Poag et al. | |
| 6,634,870 B2 | 10/2003 | Dreiman et al. | |
| 7,704,056 B2 | 4/2010 | Masoudipour et al. | |
| 8,516,850 B2* | 8/2013 | Jadric | H02K 9/10 |
| | | | 62/505 |
| 8,878,404 B2 | 11/2014 | Maki-Ontto et al. | |
| 8,959,950 B2 | 2/2015 | Doty et al. | |
| 9,207,022 B2 | 12/2015 | Sheu et al. | |
| 9,397,536 B2* | 7/2016 | Cimatti | H02K 9/19 |
| 10,008,907 B2* | 6/2018 | Hanumalagutti | H02K 3/24 |
| 10,823,467 B2* | 11/2020 | Jonsson | F25B 31/002 |
| 2008/0185924 A1* | 8/2008 | Masoudipour | H02K 5/20 |
| | | | 310/54 |
| 2009/0044548 A1 | 2/2009 | Masoudipour et al. | |
| 2009/0229280 A1 | 9/2009 | Doty et al. | |
| 2010/0006264 A1 | 1/2010 | Jadric et al. | |
| 2013/0009496 A1 | 1/2013 | Maki-Ontto et al. | |
| 2015/0256045 A1 | 9/2015 | White et al. | |
| 2015/0308456 A1 | 10/2015 | Thompson et al. | |
| 2016/0040915 A1 | 2/2016 | Jonsson et al. | |

FOREIGN PATENT DOCUMENTS

| | | |
|---|---|---|
| DE | 19624519 A1 | 1/1998 |
| DE | 10 2012 022 452 A1 | 5/2014 |
| EP | 0 778 451 | 3/2002 |
| EP | 1 024 580 | 9/2004 |
| EP | 1 947 757 | 7/2008 |
| EP | 2 940 835 A1 | 11/2015 |
| JP | H07336946 A | 12/1995 |
| JP | 2016056966 A | 4/2016 |
| TW | 201434248 A | 9/2014 |
| WO | WO-2016/160873 A1 | 10/2016 |
| WO | 2017027701 A1 | 2/2017 |

OTHER PUBLICATIONS

Taiwanese Office Action for Taiwan Application No. TW 107110026 dated Nov. 7, 2018, 11 pages.

Japanese Office Action of JP Application No. 2019-551709, dated Jan. 18, 2022, 6 pgs.

European Office Action of EP Application No. 18716857.0, dated Feb. 3, 2022, 7 pgs.

* cited by examiner

SECTION B-B

CHILLER MOTOR WITH COOLING FLOW PATH

CROSS-REFERENCE TO RELATED PATENT APPLICATIONS

This application is a U.S. National Stage Application of PCT/US2018/024113, filed Mar. 23, 2018, which claims the benefit of U.S. Provisional Application 62/476,534, filed Mar. 24, 2017, both of which are incorporated herein by reference in their entirety.

BACKGROUND

The present disclosure relates generally to an induction motor that drives the centrifugal compressor of a chiller assembly. Some centrifugal compressors utilize medium pressure (MP) refrigerant that require high speed permanent magnet motors in order to achieve a required pressure rise. Utilizing a low pressure (LP) refrigerant permits the use of cheaper and simpler induction motors that operate at lower speeds. However, the use of LP refrigerant in a motor cooling system requires a higher volumetric flow rate than an MP refrigerant. The higher volumetric flow rate results in high pressure drop and restricted flow rates through the motor cooling system, decreasing the effectiveness of the motor cooling system and resulting in motor temperatures exceeding maximum limits. When the motor temperature is not maintained within peak efficiency ranges, the overall performance of the chiller assembly is degraded.

SUMMARY

One implementation of the present disclosure is a cooling system for a motor to power a compressor in a vapor compression system. The cooling system includes a housing with a cavity enclosing the motor and defining a central axis and fluid directing features extending into the cavity and oriented parallel to the central axis. The cooling system further includes a fluid circuit configured to circulate a cooling fluid between the housing and the motor. The fluid circuit includes a first cooling fluid path defined by directing features that cause a first portion of cooling fluid to travel around a first portion of the motor and a second cooling fluid path defined by fluid directing features that cause a second portion of cooling fluid to travel around a second portion of the motor. The second portion of the motor is located opposite the first portion.

Another implementation of the present disclosure is an induction motor for a chiller assembly. The induction motor includes a stator having a cylindrical shape with an interior surface and an exterior surface. The cylindrical shape defines a central axis. The induction motor further includes a rotor coupled to a shaft. The rotor and the shaft are configured to rotate within the interior surface of the stator about the central axis. The induction motor additionally includes a housing configured to at least partially encapsulate the stator. The housing includes multiple fluid directing protrusions. The fluid directing protrusions are configured to define a first cooling fluid path for a first portion of cooling fluid and a second cooling fluid path for a second portion of cooling fluid. The first cooling fluid path and the second cooling path are serpentine-shaped.

Yet another implementation of the present disclosure is a vapor compression system. The vapor compression system includes a centrifugal compressor directly driven by an induction motor, a condenser, an expansion device, and an evaporator connected in a closed loop configured to circulate a refrigerant. The induction motor includes a stator and a rotor coupled to a shaft. The rotor and the shaft are configured to rotate within the stator. The induction motor further includes a housing with a cavity configured to encapsulate the stator and multiple refrigerant directing protrusions extending into the cavity. The refrigerant directing protrusions are configured to define a first refrigerant path for a first portion of refrigerant, and a second refrigerant path for a second portion of refrigerant.

DETAILED DESCRIPTION

Figure 1:
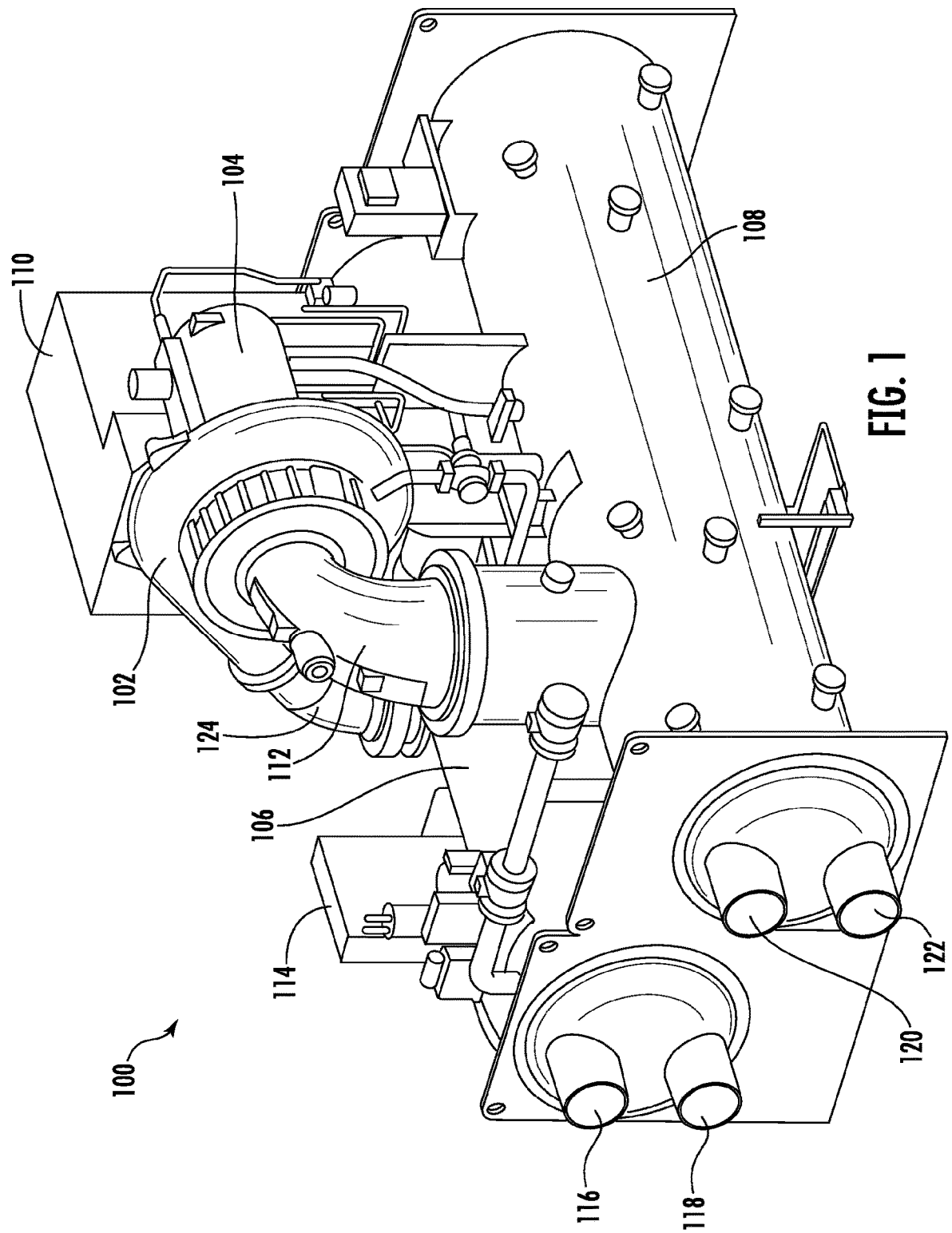
FIG. 1 is a perspective view drawing of a chiller assembly, according to some embodiments.
Figure 2:
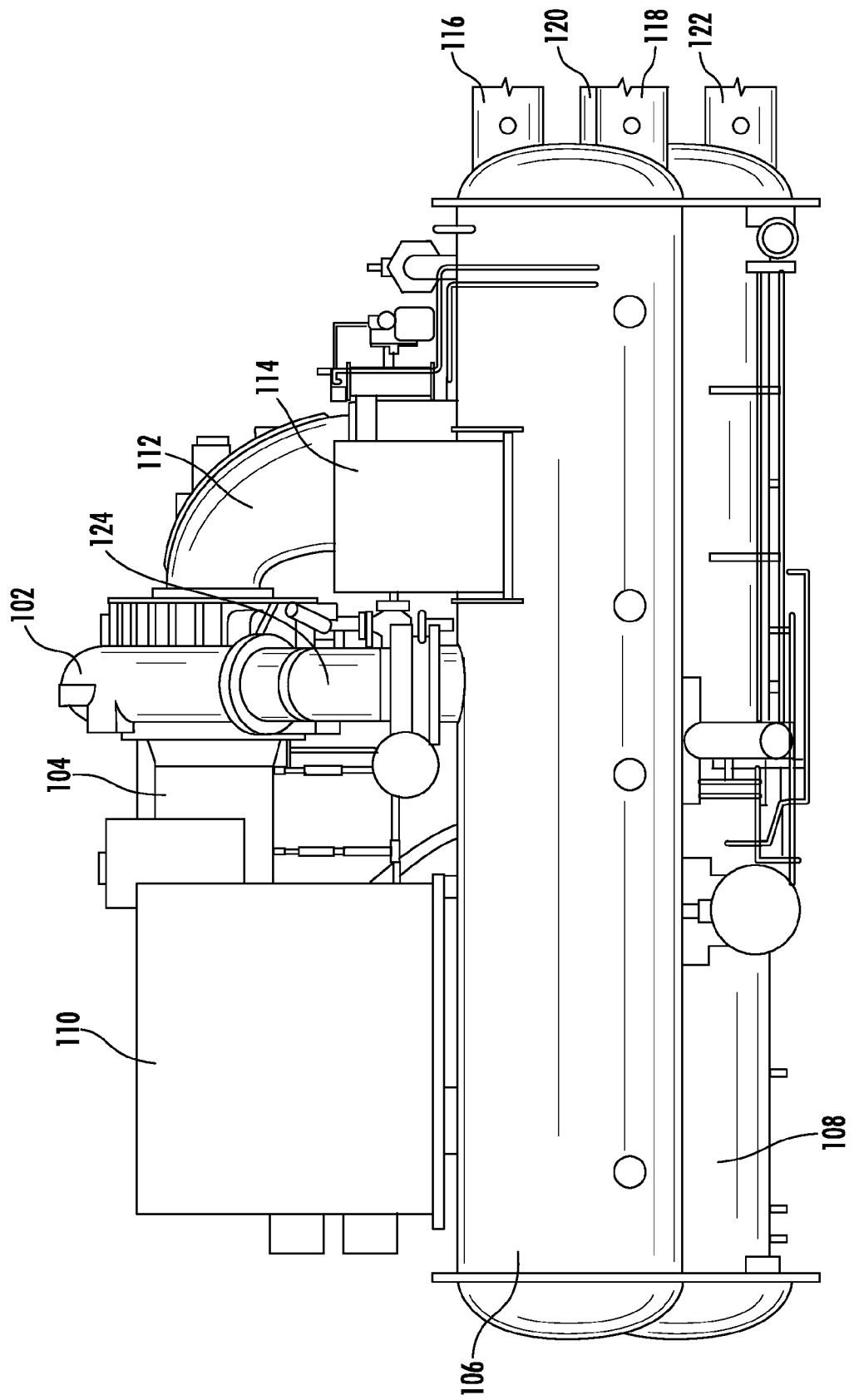
FIG. 2 is a front elevation view drawing of the chiller assembly of FIG. 1, according to some embodiments.

Referring generally to the FIGURES, a chiller assembly having a motor cooling system with split serpentine-shaped cooling fluid paths is shown. Referring to FIGS. 1-2, an example implementation of a chiller assembly 100 is depicted. Chiller assembly 100 is shown to include a compressor 102 driven by a motor 104, a condenser 106, and an evaporator 108. A refrigerant is circulated through chiller assembly 100 in a vapor compression cycle. Chiller assembly 100 can also include a control panel 114 to control operation of the vapor compression cycle within chiller assembly 100.

Motor 104 can be powered by a variable speed drive (VSD) 110. VSD 110 receives alternating current (AC) power having a particular fixed line voltage and fixed line frequency from an AC power source (not shown) and provides power having a variable voltage and frequency to motor 104. Motor 104 can be any type of electric motor than can be powered by a VSD 110. For example, motor 104 can be a high speed induction motor. Compressor 102 is driven by motor 104 to compress a refrigerant vapor received from evaporator 108 through suction line 112 and to deliver refrigerant vapor to condenser 106 through a discharge line 124. In the example described in FIGS. 1-2, compressor 102 is a centrifugal compressor.

Evaporator 108 includes an internal tube bundle (not shown), a supply line 120 and a return line 122 for supplying and removing a process fluid to the internal tube bundle. The supply line 120 and the return line 122 can be in fluid communication with a component within a HVAC system (e.g., an air handler) via conduits that that circulate the process fluid. The process fluid is a chilled liquid for cooling a building and can be, but is not limited to, water, ethylene glycol, calcium chloride brine, sodium chloride brine, or any other suitable liquid. Evaporator 108 is configured to lower the temperature of the process fluid as the process fluid passes through the tube bundle of evaporator 108 and exchanges heat with the refrigerant. Refrigerant vapor is formed in evaporator 108 by the refrigerant liquid delivered to the evaporator 108 exchanging heat with the process fluid and undergoing a phase change to refrigerant vapor.

Refrigerant vapor delivered by compressor 102 from evaporator 108 to condenser 106 transfers heat to a fluid. Refrigerant vapor condenses to refrigerant liquid in condenser 106 as a result of heat transfer with the fluid. The refrigerant liquid from condenser 106 flows through an expansion device and is returned to evaporator 108 to complete the refrigerant cycle of the chiller assembly 100. Condenser 106 includes a supply line 116 and a return line 118 for circulating fluid between the condenser 106 and an external component of the HVAC system (e.g., a cooling tower). Fluid supplied to the condenser 106 via return line 118 exchanges heat with the refrigerant in the condenser 106 and is removed from the condenser 106 via supply line 116 to complete the cycle. The fluid circulating through the condenser 106 can be water or any other suitable liquid.

Figure 3:
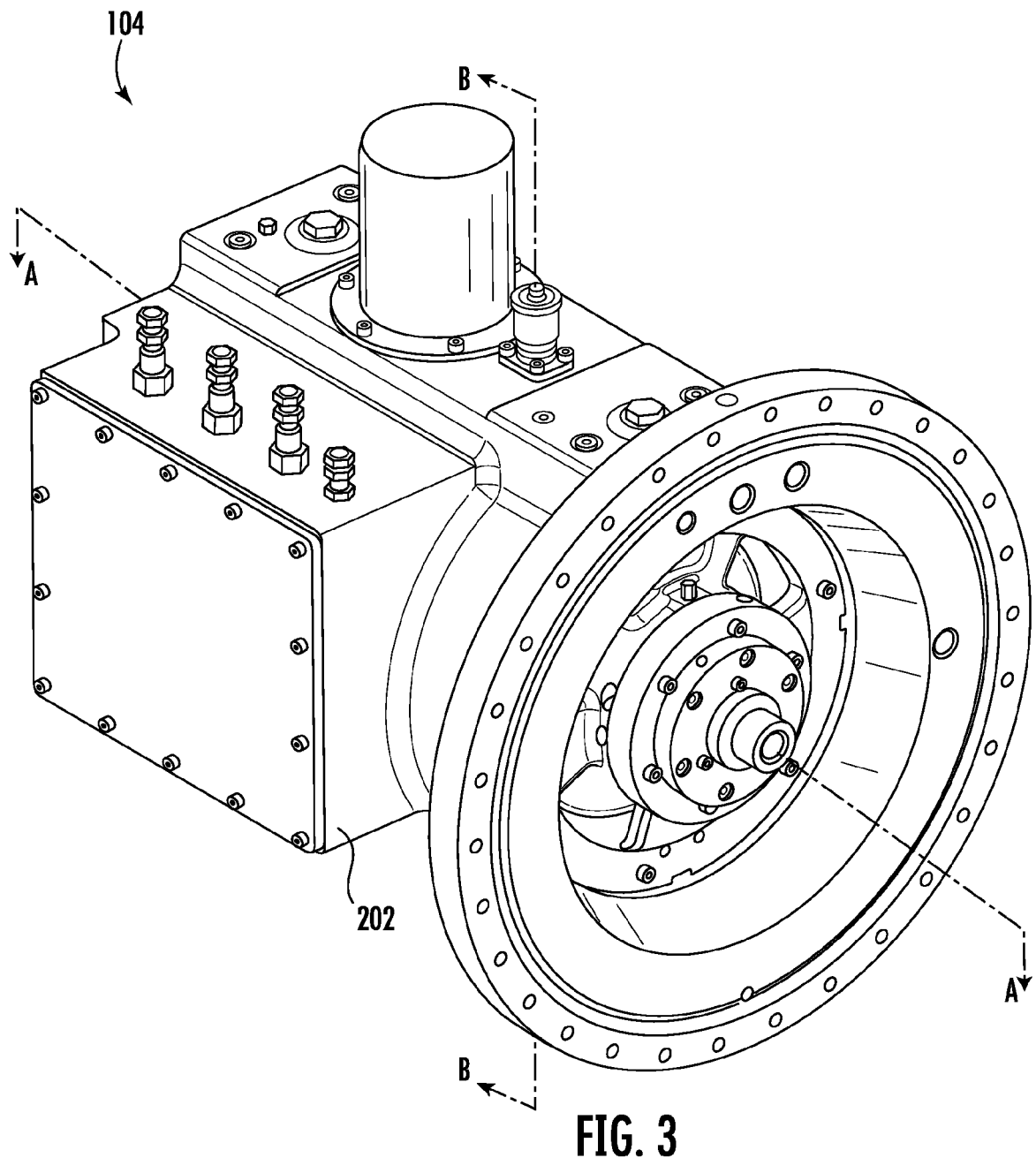
FIG. 3 is a perspective view drawing of a motor assembly used in the chiller assembly of FIG. 1, according to some embodiments.
Figure 4:
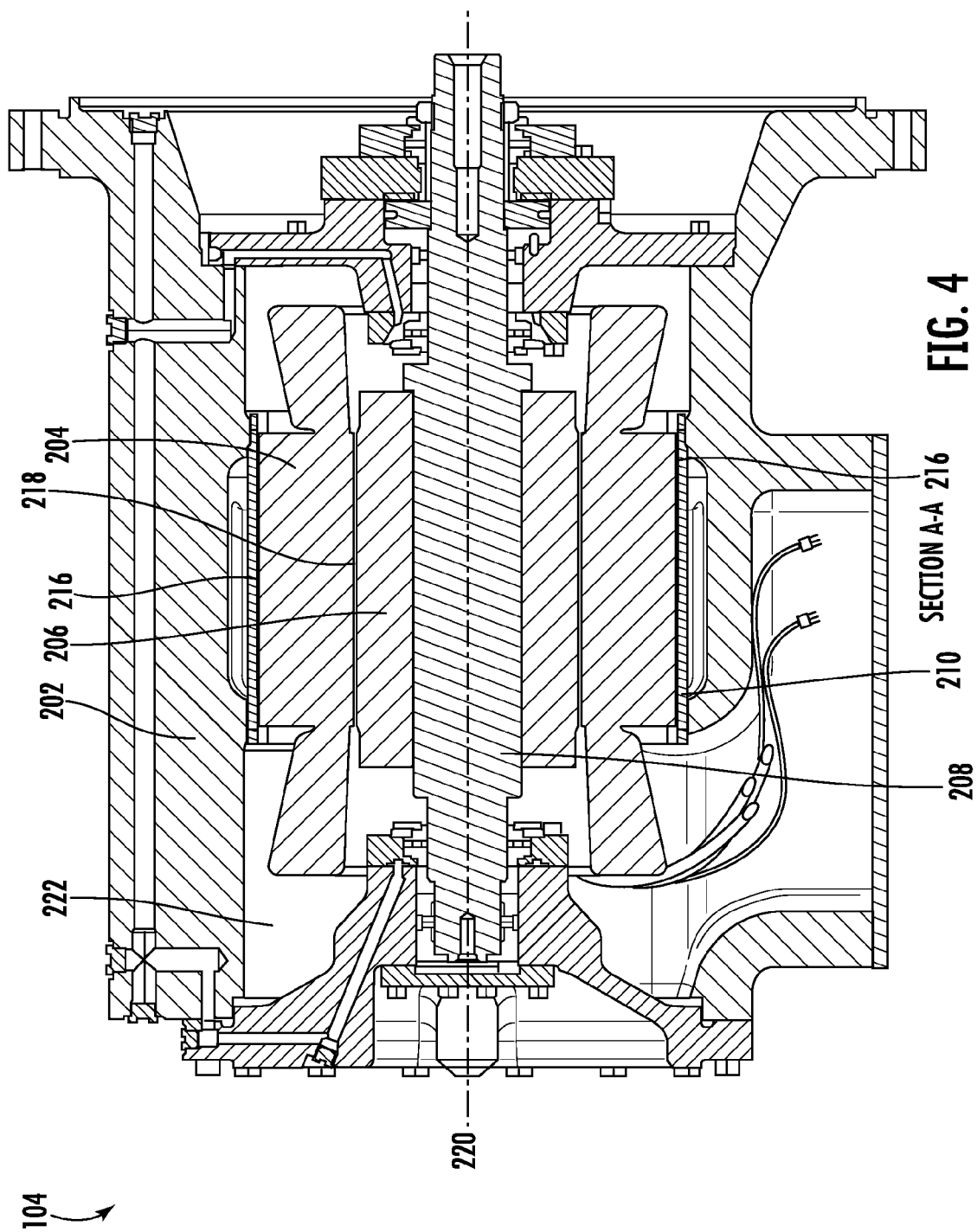
FIG. 4 is a section view drawing A-A of the motor assembly of FIG. 3, according to some embodiments.
Figure 5:
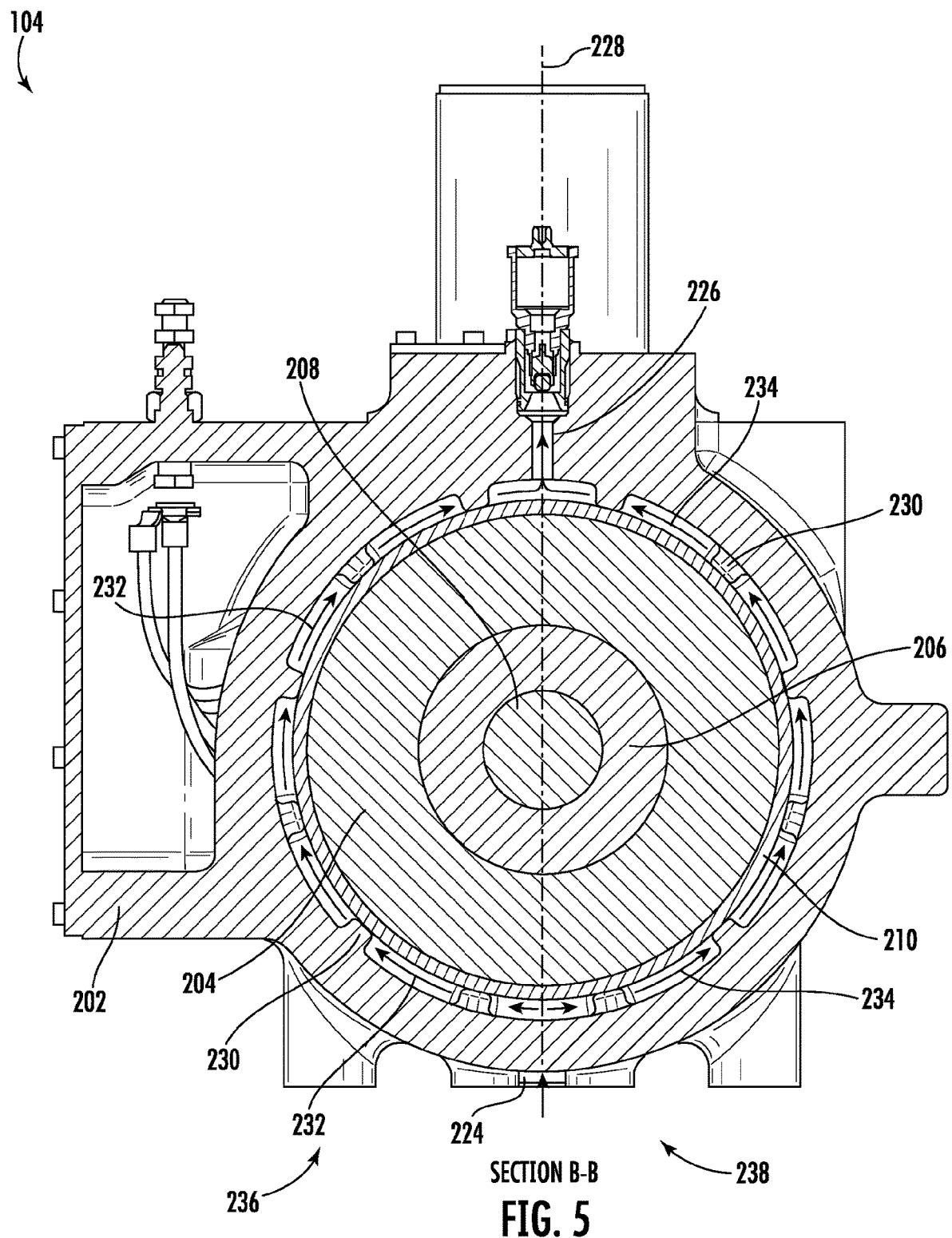
FIG. 5 is a section view drawing B-B of the motor assembly of FIG. 3, according to some embodiments.

Referring now to FIGS. 3-5, views of the motor 104 are shown, according to some embodiments. Specifically, FIG. 3 depicts an isometric view of the motor 104 including the motor housing 202, while FIG. 4 depicts a top sectional view A-A of the motor 104, and FIG. 5 depicts a side sectional view B-B of the motor 104. Motor 104 is shown to include, among other components, an enclosure or housing 202, a stator 204, and a rotor 206. The stator 204 and the rotor 206 are located within a cavity 222 of the motor housing 202. The stator 204 is the stationary part of the motor's electromagnetic circuit that imparts radial and axial magnetic forces on the rotor 206. In a properly aligned system, the sum of these forces is zero, or nearly zero. In some embodiments, the stator 204 is partially encapsulated by a motor jacket 210 that is coupled to an exterior surface 216 of the stator 204. Both the stator 204 and the motor jacket 210 may have a substantially cylindrical shape. The motor jacket 210 may be constructed from aluminum and may be configured to optimize heat transfer from the stator 204 to prevent overheating of the motor 104.

The rotor 206 is the rotating part of the motor's electromagnetic circuit. In various embodiments, the rotor 206 may be a squirrel-cage rotor, a wound rotor, a salient-pole rotor, or a cylindrical rotor. The rotor 206 is coupled to a shaft 208. The rotor 206 and the shaft 208 collectively rotate about a central axis 220 and within an interior surface 218 of the stator 204 in order to transmit torque and rotation to other components and/or assemblies (e.g., the compressor 102) that are coupled to the motor 104.

Referring specifically to side sectional view depicted in FIG. 5, the motor housing 202 is further shown to include a cooling fluid inlet 224 located at the bottom of the motor housing 202, and a cooling fluid outlet 226 located at the top of the motor housing 202. In some embodiments, the cooling fluid inlet 224 is fluidly coupled to a condenser assembly (e.g., condenser 106) which supplies the cooling fluid for the cooling system. The cooling fluid outlet 226 may be configured to remove cooling fluid from a cooling fluid circuit surrounding the motor jacket 210 and stator 204.

When a supply of cooling fluid enters the fluid circuit through the fluid inlet 224, fluid directing features 230 extending from the motor housing 202 and into the region between the housing 202 and the motor jacket 210 cause the fluid to split into a first portion and a second portion. The first portion travels along a first fluid path 232 of a first portion 236 of the motor 104, while the second portion travels along a second fluid path 234 of a second portion 238 of the motor 104. The first portion 236 and the second portion 238 are located on opposite sides of the motor 104 relative to a vertical axis 228.

In some embodiments, the cooling fluid supplied from the condenser assembly is a low pressure (LP) refrigerant that has an operating pressure of less than 400 kPa or approximately 58 psi. In further embodiments, the LP refrigerant is R1233zd. R1233zd is a non-flammable fluorinated gas with low Global Warming Potential (GWP) relative to other refrigerants utilized in commercial chiller assemblies. GWP is a metric developed to allow comparisons of the global warming impacts of different gases, by quantifying how much energy the emissions of 1 ton of a gas will absorb over a given period of time, relative to the emissions of 1 ton of carbon dioxide.

Figure 6:
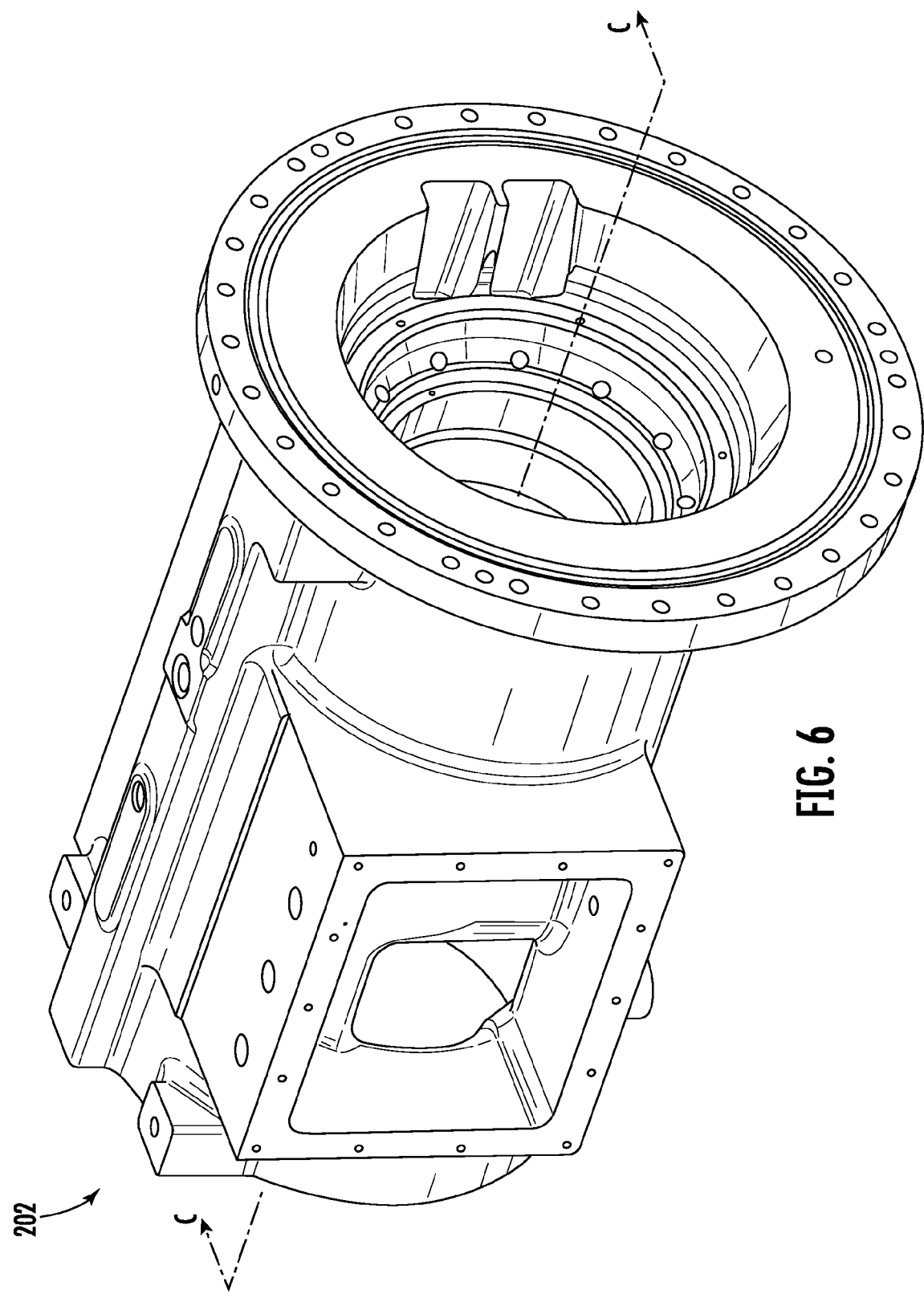
FIG. 6 is a perspective view housing of a motor housing used in the motor assembly of FIG. 3, according to some embodiments.
Figure 7:
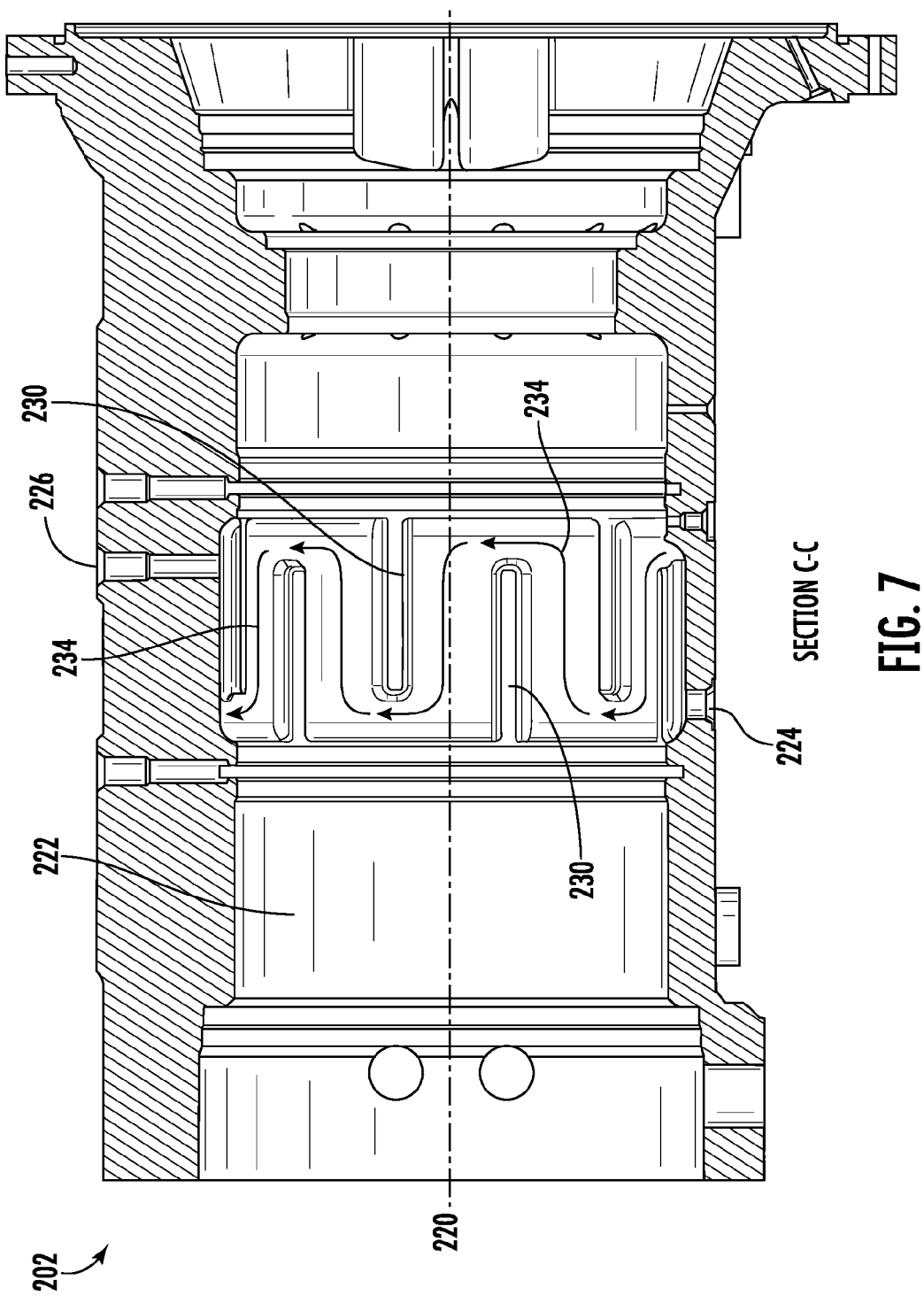
FIG. 7 is a section view drawing C-C of the motor housing of FIG. 6, according to some embodiments.

Turning now to FIGS. 6-7, views of the motor housing 202 are shown, according to some embodiments. Specifically, FIG. 6 is a perspective view of the motor housing 202, while FIG. 7 is a side sectional view C-C of the motor housing 202. As described above, motor housing 202 is shown to include multiple flow directing features 230 that protrude from the motor cavity 222 and into the region between the motor housing 202 and the motor jacket 210 that encapsulates the stator 204. The flow directing features 230 are shown to be staggered and oriented parallel to the central axis 220 such that the cooling fluid flow path 234 around the flow directing features 230 is serpentine-shaped. In other embodiments, the flow directing features 230 may have any shape or orientation required to achieve a desired cooling fluid flow path. Similarly, FIG. 7 depicts the cooling fluid inlet 224 spaced apart from the cooling fluid outlet 226 relative to the central axis 220. In other embodiments, the cooling fluid inlet 224 and the cooling fluid outlet 226 may be oriented relative to each other to achieve a desired cooling fluid flow path.

Figure 8A:
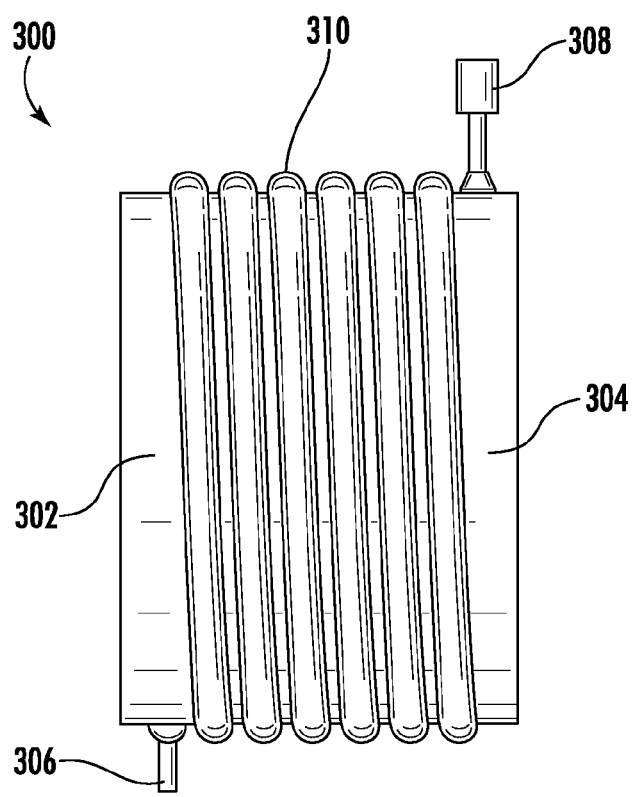
FIG. 8A is a side elevation view drawing of a helical flow path cooling system, according to some embodiments.
Figure 8B:
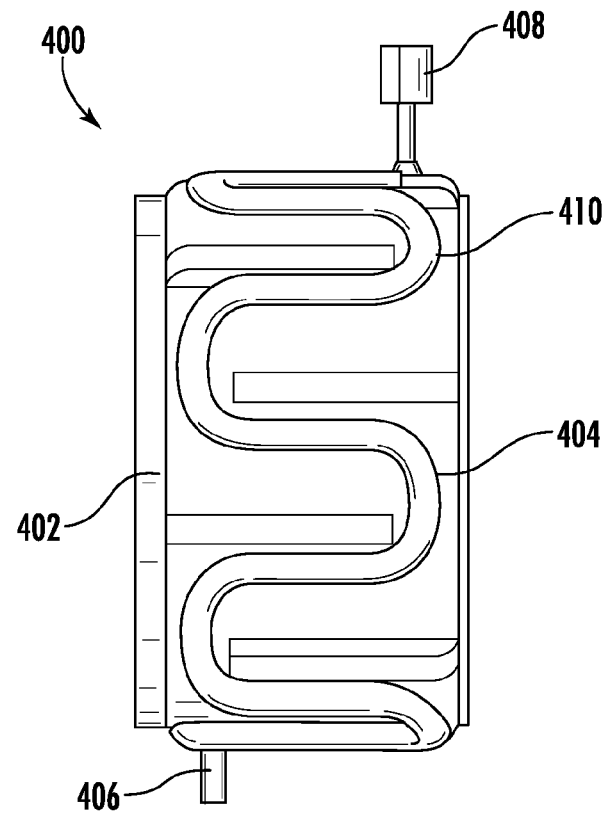
FIG. 8B is a side elevation view drawing of a split serpentine flow path cooling system, according to some embodiments.

Referring now to FIGS. 8A-8B, a comparison of the cooling provided by a helical flow path cooling system 300 and a split serpentine flow path cooling system 400 are shown, according to some embodiments. Referring specifically to FIG. 8A, cooling system 300 is shown to include a helical-shaped cooling fluid path 310 that stretches from a first end of a motor 302 to a second end of a motor 304. The helical-shaped cooling fluid path 310 may receive a supply of cooling fluid (e.g., LP refrigerant) at an inlet 306 and may expel the supply of cooling fluid at an outlet 308. Due to the orientation and shape of the cooling fluid path 310, the cooling fluid gains heat as it travels from the inlet 306 to the outlet 308. Thus, the first end of the motor 302 is significantly cooler than the second end of the motor 304. In addition, the length of the cooling fluid path 310 results in a high pressure drop from the first end of the motor 302 to the second end of the motor 304, further decreasing the ability of cooling fluid flowing through cooling fluid path 310 to adequately cool the second end of the motor 304.

By contrast, the split serpentine flow path cooling system 400 depicted in FIG. 8B and described above with reference to FIGS. 5 and 7, results in a consistent temperature distribution across a first end of the motor 402 to a second end of the motor 404. Similar to cooling system 300, cooling system 400 is shown to include a cooling fluid path 410 that receives a supply of cooling fluid at an inlet 406 and expels the supply of cooling fluid at an outlet 408. However, unlike the cooling fluid path 310, as described above, the split cooling fluid path 410 separates the cooling fluid received at the inlet 406 into a first portion that flows around one side of the motor, and a second portion that flows opposite the first portion until the two portions are joined and exit the fluid circuit through the outlet 408. The flow area represented by the cooling fluid path 410 is thus approximately quadruple the flow area represented by the cooling fluid path 310, and results in a cooling fluid pressure drop from the inlet 406 to the outlet 408 that is approximately one-eighth the pressure drop from the inlet 306 to the outlet 308.

The construction and arrangement of the systems and methods as shown in the various exemplary embodiments are illustrative only. Although only example embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

What is claimed is:

1. A cooling system for a motor to power a compressor in a vapor compression system, the cooling system comprising:
    a housing comprising:
        a cavity enclosing the motor and defining a central axis;
        a plurality of fluid directing features extending radially inward into the cavity toward the central axis, wherein each fluid directing feature of the plurality of fluid directing features extends linearly along the central axis;
        a first connection disposed at a bottom of the housing and configured to receive a cooling fluid from a condenser assembly of the vapor compression system; and
        a second connection disposed at a top of the housing and configured to remove the cooling fluid from the housing, wherein the first connection and the second connection extend along one or more axes extending cross-wise to the central axis, and wherein the plurality of fluid directing features, the first connection, and the second connection are disposed at a common axial location along the central axis; and
    a fluid circuit configured to circulate the cooling fluid between the housing and the motor, the fluid circuit comprising:
        a first cooling fluid path defined at least partially by the plurality of fluid directing features that cause a first portion of the cooling fluid to travel around a first portion of the motor, and
        a second cooling fluid path defined at least partially by the plurality of fluid directing features that cause a second portion of the cooling fluid to travel around a second portion of the motor, wherein the second portion of the motor is located opposite the first portion of the motor.

2. The cooling system of claim 1, wherein the first cooling fluid path and the second cooling fluid path are serpentine-shaped.

3. The cooling system of claim 1, wherein the cooling fluid is a low pressure refrigerant having an operating pressure of less than 400 kPa.

4. The cooling system of claim 3, wherein the low pressure refrigerant is R1233zd.

5. The cooling system of claim 1, wherein the one or more axes comprise a vertical axis extending perpendicular to the central axis.

6. An induction motor for a chiller assembly, the induction motor comprising:
    a stator having a cylindrical shape with an interior surface and an exterior surface, the cylindrical shape defining a central axis;
    a rotor coupled to a shaft, the rotor and the shaft configured to rotate within the interior surface of the stator about the central axis; and
    a housing configured to at least partially encapsulate the stator, the housing comprising:
        a plurality of fluid directing protrusions extending radially inward toward the central axis, the plurality of fluid directing protrusions configured to define a first cooling fluid path for a first portion of a cooling fluid and a second cooling fluid path for a second portion of the cooling fluid, wherein each fluid directing protrusion of the plurality of fluid directing protrusions extends linearly along the central axis;
        a first connection disposed at a bottom of the housing and configured to receive the cooling fluid from a condenser assembly of the chiller assembly; and
        a second connection disposed at a top of the housing and configured to remove the cooling fluid from the housing, wherein the first connection and the second connection extend along an axis extending perpendicular to the central axis, and wherein the first connection and the second connection overlap with the plurality of fluid directing protrusions along the central axis;
    wherein the first cooling fluid path and the second cooling fluid path are serpentine-shaped.

7. The induction motor of claim 6, further comprising a motor jacket coupled to the exterior surface of the stator.

8. The induction motor of claim 7, wherein the first cooling fluid path is located between the housing and a first portion of the motor jacket, and wherein the second cooling fluid path is located between the housing and a second portion of the motor jacket, the first portion of the motor jacket located opposite the second portion of the motor jacket.

9. The induction motor of claim 6, wherein the cooling fluid is a low pressure refrigerant having an operating pressure of less than 400 kPa.

10. A vapor compression system, comprising:
    a centrifugal compressor directly driven by an induction motor, a condenser, and an evaporator connected in a closed loop configured to circulate a refrigerant;
    wherein the induction motor comprises:
        a stator;
        a rotor coupled to a shaft, the rotor and the shaft configured to rotate about a central axis within the stator; and
        a housing comprising:
            a cavity configured to at least partially encapsulate the stator;
            a plurality of refrigerant directing protrusions extending radially inward toward the central axis and into the cavity and configured to define a first refrigerant path for a first portion of the refrigerant, and a second refrigerant path for a second portion of the refrigerant, wherein each refrigerant directing protrusion of the plurality of refrigerant directing protrusions extends linearly along the central axis;

an inlet disposed at a bottom of the housing and configured to receive the refrigerant from the condenser; and an outlet disposed a top of the housing and configured to remove the refrigerant from the housing, wherein the inlet and the outlet extend along one or more axes extending cross-wise to the central axis, and wherein the plurality of refrigerant directing protrusions, the inlet, and the outlet are disposed at a common axial location along the central axis.

11. The vapor compression system of claim 10, wherein the first refrigerant path and the second refrigerant path are serpentine-shaped.

12. The vapor compression system of claim 10, further comprising a motor jacket coupled to the stator, wherein the first refrigerant path is located between the cavity and a first portion of the motor jacket, and wherein the second refrigerant path is located between the cavity and a second portion of the motor jacket, the first portion of the motor jacket located opposite the second portion of the motor jacket.

13. The vapor compression system of claim 10, wherein the refrigerant is a low pressure refrigerant having an operating pressure of less than 400 kPa.

\* \* \* \* \*